United States Patent
Ugrewicz

(10) Patent No.: US 10,412,991 B2
(45) Date of Patent: Sep. 17, 2019

(54) RESERVOIR FOR ROD-LIKE ELEMENTS FOR TOBACCO INDUSTRY

(71) Applicant: International Tobacco Machinery Poland Sp. z o.o., Radom (PL)

(72) Inventor: Grzegorz Ugrewicz, Radom (PL)

(73) Assignee: INTERNATIONAL TOBACCO MACHINERY POLAND SPOLKA Z OGRANICZONA ODPOWIEDZIALNOSCIA, Radom (PL)

( * ) Notice: Subject to any disclaimer, the term of this patent is extended or adjusted under 35 U.S.C. 154(b) by 0 days.

(21) Appl. No.: 16/069,806

(22) PCT Filed: Apr. 18, 2017

(86) PCT No.: PCT/EP2017/059079
§ 371 (c)(1),
(2) Date: Jul. 12, 2018

(87) PCT Pub. No.: WO2017/182414
PCT Pub. Date: Oct. 26, 2017

(65) Prior Publication Data
US 2019/0014812 A1    Jan. 17, 2019

(30) Foreign Application Priority Data
Apr. 21, 2016  (PL) .......................................... 416915

(51) Int. Cl.
*A24C 5/35*  (2006.01)
*B65G 47/68*  (2006.01)
*B65G 47/76*  (2006.01)
*A24C 5/32*  (2006.01)

(52) U.S. Cl.
CPC ................ *A24C 5/35* (2013.01); *A24C 5/328* (2013.01); *B65G 47/681* (2013.01); *B65G 47/766* (2013.01); *B65G 2201/0226* (2013.01)

(58) Field of Classification Search
CPC ........... A24C 5/322; A24C 5/35; A24C 5/478; B65G 47/19; B65G 2201/0226; B65G 47/57; B65G 47/58; B65G 3/00; B65G 1/00; B65G 47/5113; B65G 47/5159
USPC ....................................................... 198/347.1
See application file for complete search history.

(56) References Cited

U.S. PATENT DOCUMENTS 3,921,790 A * 11/1975 Hinchcliffe ............ A24C 5/352
                                                            198/347.3
4,030,595 A *  6/1977 McCombie .............. A24C 5/35
                                                            198/347.3
4,099,608 A *  7/1978 McCombie .............. A24C 5/35
                                                            198/347.3
(Continued)

FOREIGN PATENT DOCUMENTS

DE           1957002 A1    9/1970
WO     WO2002096227 A2   12/2002

OTHER PUBLICATIONS

International Search Report and Written Opinion for WO2017182414A1.

*Primary Examiner* — James R Bidwell
(74) *Attorney, Agent, or Firm* — Soody Tronson; STLG Law Firm

(57) ABSTRACT

An adjustable capacity reservoir for processing rod-like elements for tobacco industry, having partitioned multiple chambers.

22 Claims, 5 Drawing Sheets

(56) References Cited

U.S. PATENT DOCUMENTS

| | | | | |
|---|---|---|---|---|
| 4,744,453 A | * | 5/1988 | Krause | A24C 5/35 131/282 |
| 6,390,273 B1 | * | 5/2002 | Muller | A24C 5/35 198/347.1 |
| 7,044,286 B2 | * | 5/2006 | Sikora | A24C 5/35 198/347.1 |
| 2004/0104240 A1 | | 6/2004 | Spatafora | |
| 2014/0158498 A1 | * | 6/2014 | Wardecki | A24C 5/35 198/347.1 |

* cited by examiner

RESERVOIR FOR ROD-LIKE ELEMENTS FOR TOBACCO INDUSTRY

TECHNICAL FIELD

The present disclosure relates to a reservoir for rod-like elements for tobacco industry.

BACKGROUND

In tobacco industry, semi-finished products in form of filtering or cigarette rods, as well as final products in form of cigarettes, cigarillos or cigars, are transported between machines at manufacturing lines in a form of a multilayer flow, also called a mass flow. The mass flow is conducted by horizontal, inclined and vertical conveyors. Additionally, vertical or inclined gravitational ducts are utilized. At the connection points between different kinds of ducts, buffering reservoirs are usually used, to compensate for different flow efficiencies of connected ducts, in order to change the flow parameters over time. The connected ducts may have different cross-sections and different flow efficiencies.

In the state of the art there are known various connections between ducts, for example such as disclosed in the following patent publications: GB 1276494, U.S. Pat. No. 4,030,595, GB 2 029 787 or DE 1957002, which disclose a connection between two horizontal ducts equipped with conveyors and a gravitational duct, wherein the horizontal ducts are the feeding ducts, while the vertical duct is the receiving duct. From the vertical duct, products are received by a packaging machine or, generally speaking, by a receiving machine. The presented reservoirs have adjustable capacity and are equipped with rigid swinging elements, elastic elements or net-like elements with loosely connected mesh for reading the filling level of the reservoir.

The U.S. Pat. No. 3,921,790 discloses a connection of two horizontal feeding ducts equipped with conveyors with a gravitational duct, wherein the horizontal ducts have different width. In case of decreased efficiency of a machine which receives products from the vertical duct, a temporary excess of products is accumulated in the reservoir, which is detected by a sensor, and the speed of the conveyors is decreased or the conveyors (optionally one of the conveyors) are stopped. In case of a decrease of the amount of the rod-like elements in the reservoir, the flow speed in the ducts is increased or the speed of receiving of the elements is decreased. The presented solutions do not allow for independent speed control of the conveyors in the feeding ducts, because it is difficult to clearly determine to what extent the flows from particular ducts influence the degree of filling of the reservoir.

SUMMARY

There is disclosed herein a reservoir for rod-like elements for tobacco industry, configured to be connected to a first feeding duct for feeding the reservoir with a first stream of elements through a first inlet of a first reservoir side, to a second feeding duct for feeding the reservoir with a second stream of elements through a second inlet of a second reservoir side, opposite to the first reservoir side, and to a receiving duct for receiving the rod-like elements from the reservoir, wherein the reservoir has adjustable capacity and is coupled with filling level sensing means for sensing a filling level of the reservoir. The reservoir comprises two chambers having adjustable capacity and separated by a partition. The first chamber is located between the first feeding duct and the receiving duct and comprises a first boundary surface, which limits the space of the first chamber; and the second chamber is located between the second feeding duct and the receiving duct and comprises a second boundary surface, which limits the space of the second chamber. The first chamber is coupled with a first filling level sensing means for sensing a filling level of the first chamber, and the second chamber is equipped with a second filling level sensing means for sensing a filling level of the second chamber. The first filling level sensing means comprises a first guiding surface displaceable between the blocking and non-blocking position, which in the blocking position constitutes the wall for the stream of elements flow from the second feeding duct through the second chamber to the receiving duct; and the second filling level sensing means comprises a second guiding surface displaceable between the blocking and non-blocking position, which in the blocking position constitutes the wall for the stream of elements flow from the first feeding duct through the first chamber to the receiving duct.

The first guiding surface can be configured to displace towards the non-blocking position upon the rise of the ratio of the flow of the stream of elements from the first feeding duct with respect to the flow of the stream of elements of the receiving duct, and the second guiding surface is configured to displace towards the non-blocking position upon the rise of the ratio of the flow of stream of elements from the second feeding duct with respect to the flow of stream of elements from the receiving duct.

The first guiding surface can be configured to be in the blocking position when there is no flow of stream of elements from the first feeding duct, and the second guiding surface is configured to be in the blocking position when there is no flow of stream of elements from the second feeding duct.

The first guiding surface in the non-blocking position may be configured so that it does not limit the space of the second chamber, and the second guiding surface in the non-blocking position does not limit the space of the first chamber.

The inlet from the first feeding duct and the inlet from the second feeding duct can be positioned horizontally.

The inlet from the first feeding duct and the inlet from the second feeding duct can be positioned on the same level.

The reservoir may further comprise a controller connected to the first filling level sensing means, to the second filling level sensing means, to at least one conveyor of the first feeding duct and to at least one conveyor of the second feeding duct and is configured to generate signals controlling the speed of the transporters of the feeding ducts on the basis of the signal, concerning the filling level of the first chamber, received from the first filling level sensing means and the signal, concerning the filling level of the second chamber, received from the second filling level sensing means.

The reservoir according to the present invention allows to operate and control each feeding duct independently. The advantage of the device according to the invention is that when only one feeding duct is supplied at a time, the elements arriving from the second duct are not damaged. In devices known from the prior art, when one of the feeding ducts is stopped, the elements accumulated in the reservoir might be damaged by being chafed by elements arriving from the second duct, due to the lack of exchange of the elements in the part of the reservoir at the side of the stopped duct.

BRIEF DESCRIPTION OF FIGURES

The system is shown by means of example embodiments in a drawing, in which.

DETAILED DESCRIPTION

Figure 1:
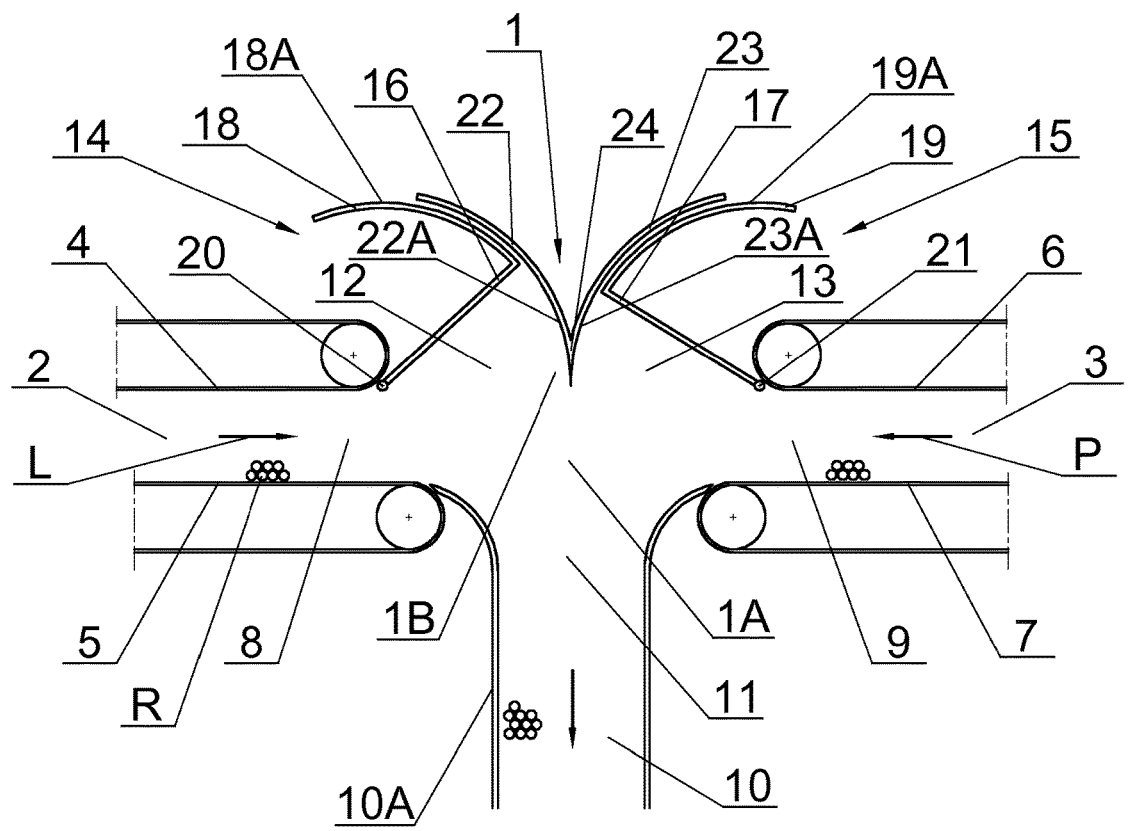
FIG. 1 shows a reservoir according to the invention.

As shown in FIG. 1, a first feeding duct 2 and a second feeding duct 3 are connected to a reservoir 1, at its opposite ends. The first feeding duct 2 connected to a first side of the reservoir 1 comprises an upper conveyor 4 and a lower conveyor 5, which are positioned substantially horizontally. The second feeding duct connected to a second side of the reservoir 1, comprises a first conveyor 6 and a second conveyor 7, which are positioned substantially horizontally. The feeding ducts 2, 3 may be equipped only with the conveyors 5 and 7 and stationary walls instead of the conveyors 4 and 6. The conveyors 4, 5, 6, 7 may have a form of chain or belt conveyors. The feeding ducts 2 and 3 supply rod-like elements R to the reservoir 1 by two flows, respectively through, an inlet 8 from the first duct 2 and an inlet 9 from the second duct 3. The feeding ducts 2 and 3 supply the rod-like articles R to the reservoir 1 from two directions, substantially opposite to each other. The ducts 2 and 3 may be positioned horizontally or may be inclined with respect to the horizontal direction. There is a substantially vertical receiving duct 10 directed downwards, coming from the reservoir 1, where the rod-like elements R in a form of a stream enter through an outlet 11 of the reservoir. In each of the ducts, the elements are positioned substantially horizontally and in parallel to the duct walls—in the drawing there are shown several elements in each duct, wherein they are positioned perpendicularly to the surface of the drawing and the direction of their motion in the multilayered stream is indicated by arrows. The rod-like elements usually fill completely the volume of the feeding duct 2, 3 and the volume of the receiving duct 10—however, in the drawing, for clarity, there are shown only a few rod-like elements R. In the receiving duct 10 the rod-like elements move under the force of gravity. The receiving duct 10 may also have conveyors, located along the vertical walls of the duct 10A, forcing the downward movement of the elements. The receiving duct 10 may be inclined by a certain angle with respect to the vertical or may be arched.

The reservoir 1 is formed as a two-part or a double chamber reservoir. The reservoir 1 has a first chamber 12 and a second chamber 13, wherein these chambers are joined at a bottom side 1A of the reservoir. The reservoir 1 chambers 12 and 13 have adjustable capacity. Each chamber 12, 13 is equipped with filling level sensing means 14, 15, for reading the filling level of the chamber. The first chamber 12 is equipped with the first sensing means 14, and the second chamber 13 is equipped with the second sensing means 15. In the embodiment shown, the sensing means have a form of swinging elements. The first swinging element comprises a plate 16 and an arched element 18 and is pivotally mounted on an axis 20 on which the sensor (not shown in the drawing) is mounted, adapted to read the angular position of the swinging element. The arched element 18 has a first guiding surface 18A. The second swinging element has a plate 17 and an arched element 19 and is pivotally mounted on an axis 21 on which the sensor (not shown in the drawing) is mounted, adapted to read the angular position of the swinging element. The arched element 19 has a second guiding surface 19A. The chambers of the reservoir are enclosed by boundary walls. The first chamber 12 is enclosed by a boundary wall 22, which at the side of the filling level sensing means 14 has an arched boundary surface 22A. The second chamber 13 is enclosed by a boundary wall 23, which at the side of the filling level sensing means 15 has an arched boundary surface 23A. The boundary walls 22 and 23 merge together forming a partition 24 separating the chambers 12 and 13 located in an upper part 1B of the reservoir 1. The connection of the boundary surface 22A and the boundary surface 23A on the partition 24 may be rounded.

Figure 2:
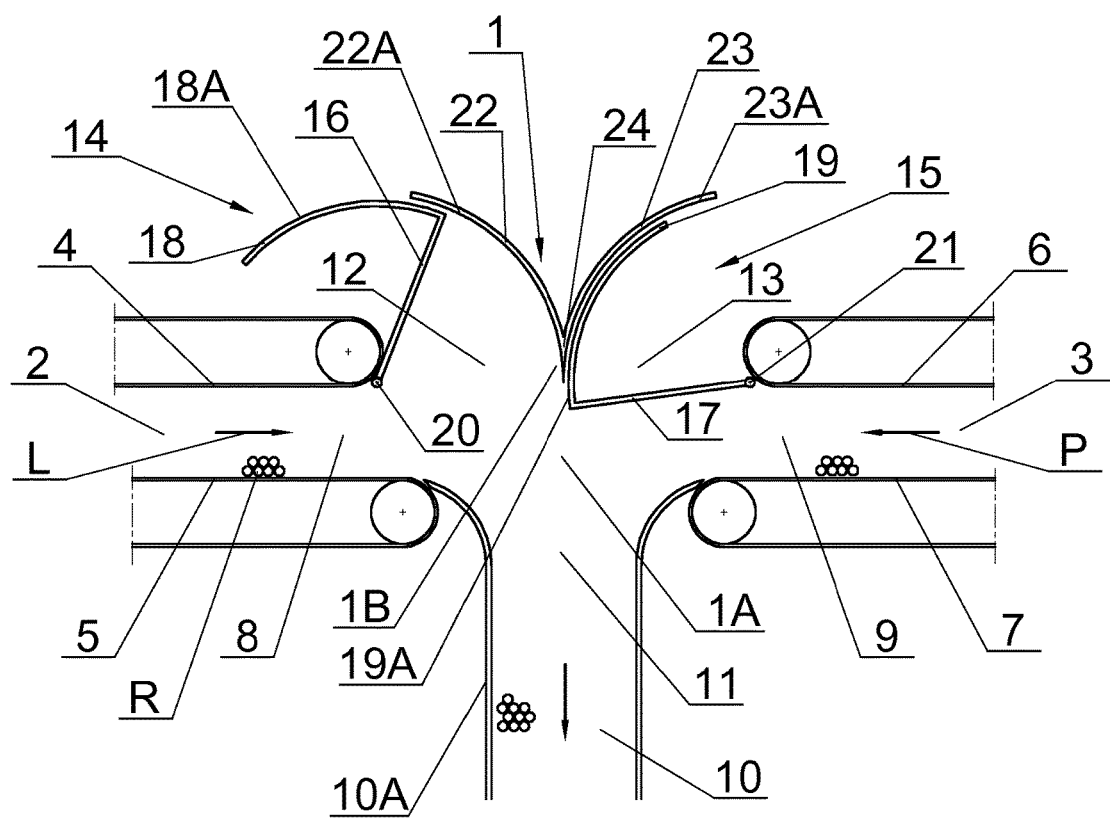
FIG. 2 shows the reservoir of FIG. 1 wherein a first chamber of the reservoir is filled to a maximal extent.
Figure 3:
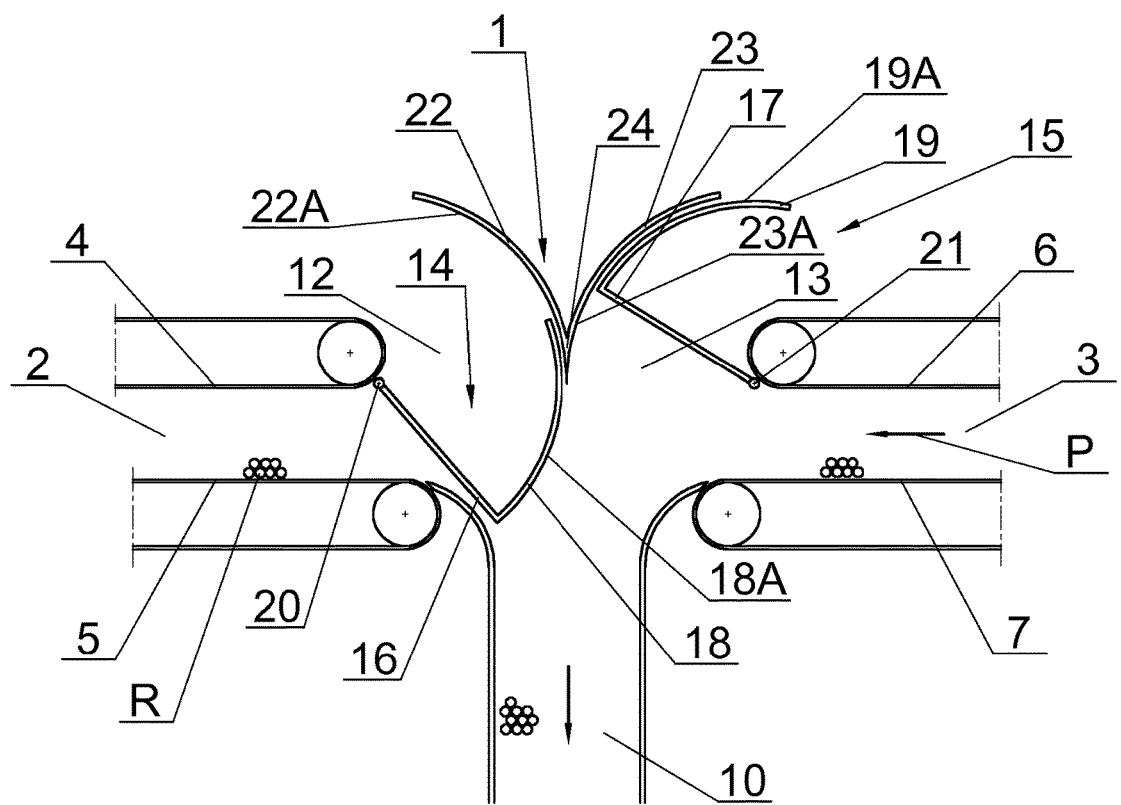
FIG. 3 shows the reservoir of FIG. 1 wherein the first chamber of the reservoir is empty.
Figure 4:
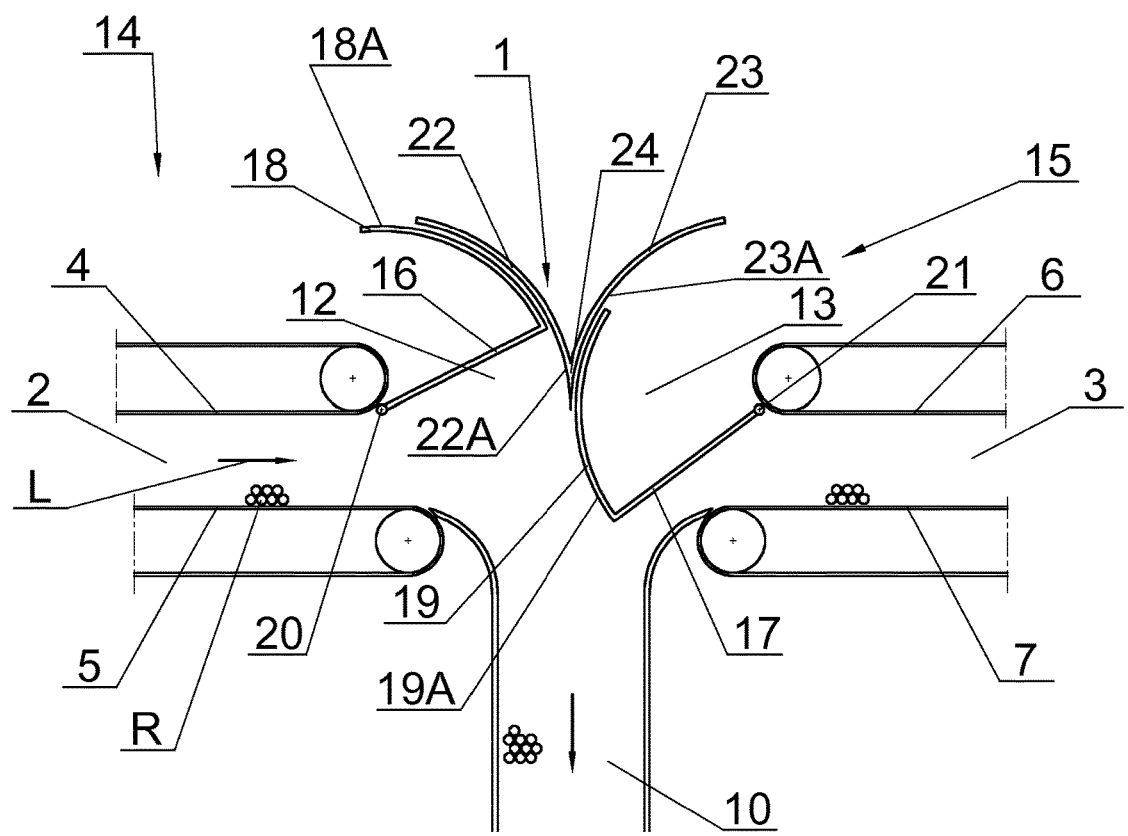
FIG. 4 shows the reservoir of FIG. 1 wherein the first chamber of the reservoir is filled to a greater degree than a second chamber.

The guiding surfaces 18A, 19A are displaceable between a blocking position (such as the position of the guiding surface 19A in FIG. 2, or 18A in FIG. 3 or 19A in FIG. 4) and a non-blocking position (such as the position of the guiding surface 18A and 19A in FIG. 1, or 18A in FIG. 2, or 19A in FIG. 3, or 18A in FIG. 4). The first guiding surface 18A in the blocking position constitutes an obstacle wall for the flow of the stream of elements arriving from the second feeding duct 3 through the second chamber 13 to the receiving duct 10 (in other words, it limits the space of the second chamber 13), and in the non-blocking position it is not an obstacle for this flow (in other words, it does not limit the space of the second chamber 13). The second guiding surface 19A in its blocking position constitutes an obstacle wall for the flow of the stream of elements arriving from the first feeding duct 2 through the first chamber 12 to the receiving duct 10 (in other words, it limits the space of the first chamber 12), and in the non-blocking position it is not an obstacle wall for this flow (in other words, it does not limit the space of the first chamber 12).

In other words, the partition between the chambers has a stationary element 24 and a displaceable element, in the form of the first displaceable surface 18A coupled with the first filling level sensing means 14 or the second displaceable guiding surface 19A coupled with the second filling level sensing means 15.

The rod-like elements R, which arrive along the L direction, move along the first feeding duct 2 through the inlet 8 to the chamber 12, then pass through this chamber 12 and next move through the outlet 11 under the force of gravity downwards through the receiving duct 10. The rod-like elements R, which arrive along the P direction are moved along the second feeding duct 3 through the inlet 9 to the chamber 13, pass through this chamber 13 and next move through the outlet 11 under the force of gravity downwards through the receiving duct 10. The conveyors of the first feeding duct 2 and the second feeding duct 3 may be activated simultaneously, it means that the feeding ducts 2 and 3 may work simultaneously, then the rod-like elements from the first feeding duct 2 and the second feeding duct 3 join together into a joint mass flow and are further transported by the receiving duct 10. The feeding speed of the feeding ducts 2 and 3 is dependent on the receiving speed by the receiving duct 10, which is dependent on the receiving machine efficiency.

Figure 5:
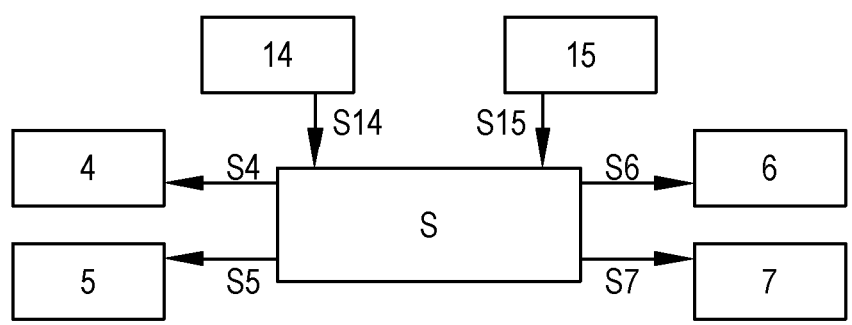
FIG. 5 shows schematically a flow of controller signals.

During the flow of the rod-like elements through the reservoir chambers, accordingly through the first chamber 12 and the second chamber 13, the sensors reading the position of the swinging arms of the filling level sensing means 14 and 15 send signals S14, S15 to the controller S, indicating the actual filling level of each chamber 12, 13. The controller, basing on these signals, sends controlling signals S4, S5, S6, S7 to conveyor drive units 4, 5, 6, 7 to adjust the speed of feeding the chambers 12, 13 by particular ducts 2, 3. The signal flow is shown schematically in FIG. 5. In case of excess filling of the first chamber 12 (FIG. 2), the sensor corresponding to the filling level sensing means 14 sends the signal S14, informing about the overfilling, to the controller S, and the controller sends the signal S4 to the conveyor drive unit 5, or the signals S4, S5 to the conveyors 4, 5 to decrease the feeding speed. When the feeding speed of the first duct 2 is too low, and consequently the filling level of the first chamber 12 (FIG. 3) is too low, the controller S sends the signal S5 to the conveyor drive unit 5 or the signals S4, S5 to the conveyors 4, 5 of the first feeding duct 2 to increase the feeding speed. In case when the first feeding duct 2 is turned off, the first filling level sensing means 14 of the first chamber 12 will remain in the position shown in FIG. 3, and the rod-like elements R arriving from the second feeding duct will flow through the chamber 13 to the receiving duct 10.

In the situation presented in FIG. 3 the sensor indicating the position of the filling level sensing means 14 will generate the signal informing about the minimal level achieved by this means, indicating lack of elements R in the chamber 12. The plate 16 prevents the elements R from escaping the feeding duct 2. The plate 16 also blocks the accidental escaping of elements R from the duct 2. The first guiding surface 18A of the element 18 belonging to the first filling level sensing means 14 is in the blocking position and is the extension of the boundary surface 23A of the boundary wall 23 of the second chamber 13. The first guiding surface 18A, which is in the blocking position, temporarily constitutes the wall of the second chamber 13 of the reservoir 1, in other words it limits the space of the second chamber 13. The guiding surface 18A, which is in the blocking position, constitutes the wall for the rod-like elements flowing through the second chamber 13. The guiding surface 18A in the blocking position also constitutes a fragment of the duct for the rod-like elements flow from the second chamber, i.e. the fragment of the duct coming to the outlet 11 and to the receiving duct 10. In particular, the first guiding surface 18A which is the blocking position simultaneously constitutes a blockade for the rod-like elements flow from the second chamber 13 to the first duct 2. In the situation presented in FIG. 3, if the flow of the rod-like elements from the feeding duct 2 is activated, the plate 16 will begin to rise and together with the surface 18A will rotate counterclockwise. Then the smaller and smaller part of the surface 18A will constitute the wall for the elements R flowing from the feeding duct 3. During a constant rise of the amount of elements in the chamber 12 the surface 18A rotates further until the non-blocking position. For the extreme maximal inclination of the filling level sensing means 14 the signal from the sensor coupled with these means will inform the controller about the maximal capacity of the chamber 12 being reached. The maximal signal from this sensor stops the feeding duct 2.

FIG. 4 shows a situation, when the second feeding duct 3 has a low feeding speed and the second chamber 13 is filled to a very small degree. The second filling level sensing means 15 of the second chamber 13 remains in the presented position. As shown, the second guiding surface 19A of the element 19 that belongs to the sensing means 15 is the extension of the boundary surface 22A of the boundary wall 22 of the first chamber 12. The second guiding surface 19A in the blocking position temporarily constitutes the wall of the first chamber 12 of the reservoir 1, in other words it limits the space of the first chamber 12. The guiding surface 19A in the blocking position constitutes the wall for the rod-like elements R flowing through the first chamber 12.

The guiding surface 19A in the blocking position also constitutes a fragment of the duct for the rod-like elements R flow from the first chamber, it means the fragment of the duct coming to the outlet 11 and the receiving duct 10. In particular, the second guiding surface 19A in the blocking position also constitutes an obstacle wall for the rod-like elements R flow from the first chamber 12 to the second duct 3. If the flow of elements from the feeding duct 3 is activated, then the plate 17 starts to rise and together with the surface 19A it rotates in the clockwise direction. Then the smaller and smaller part of the surface 19A will constitute the obstacle wall for the elements R flowing from the feeding duct 2. During a constant rise of the amount of elements in the chamber 13 the surface 19A rotates further until the non-blocking position. For the extreme maximal inclination of the filling level sensing means 15 the signal from the sensor coupled with these means will inform the controller about the maximal capacity of the chamber 13 being reached. The maximum level signal from this sensor will stop the feeding duct 3.

The rise of the ratio of flow of stream of elements from the first feeding duct 2 with respect to the flow of stream of elements of the receiving duct 10, causes pressure of the stream of elements inside the first chamber 12 on the first filling level sensing means 14, and thereby displacement of the first guiding surface 18A towards the non-blocking position and vice versa (decrease of the ratio causes the displacement of the first guiding surface 18A towards the blocking position). In turn the rise of the ratio of the flow of stream of elements from the second feeding duct 3 with respect to the flow of stream of elements of the receiving duct 10 causes pressure of the stream of elements inside the second chamber 13 on the second filling level sensing means 15, and thereby displacement of the first guiding edge 19A towards the non-blocking position and vice versa (decrease of the ratio causes the displacement of the second guiding surface 19A towards the blocking position). Therefore when there is no flow or a very small flow of the stream of elements from the first feeding duct 2, the first guiding surface 18A is in the blocking position. Similarly when there is no flow or a very small flow of stream of elements from the second feeding duct 3, the second guiding surface 19A is in the blocking position.

It is also possible to control the feeding speeds in the feeding ducts so that one duct feeds the rod-like elements and the second duct is responsible for complementing the flow of elements when the efficiency of the first duct is not able to reach the efficiency of the receiving duct.

The invention claimed is:

1. An adjustable capacity reservoir for processing of rod-like elements for tobacco industry, comprising:
 a. a first inlet at a first reservoir side connectable to a first feeding duct for feeding a first stream of the rod-like elements to the reservoir through the first inlet;
 b. a second inlet at a second reservoir side opposite the first reservoir side connectable to a second feeding duct for feeding a second stream of rod-like elements to the reservoir through the second inlet;
 c. a receiving duct connectable to the reservoir for receiving the rod-like elements from the reservoir;
 d. a first chamber located between the first feeding duct and the receiving duct and having a first boundary surface for defining the capacity of the first chamber;
 e. a second chamber located between the second feeding duct and the receiving duct and having a second boundary surface for defining the capacity of the second chamber and being separated from the first chamber by a partition disposed therebetween;

f. a first filling level sensing means coupled with the first chamber for sensing a filling level of the first chamber and including a displaceable first guiding surface having a non-blocking position and a blocking position for forming an obstacle to the flow of the second stream of elements from the second feeding duct through the second chamber to the first feeding duct; and g. a second filling level sensing means coupled with the second chamber for sensing a filling level of the second chamber and including a displaceable second guiding surface having a non-blocking position and a blocking position for forming an obstacle to the flow of the first stream of elements from the first feeding duct through the first chamber to the second feeding duct.

2. The reservoir according to claim 1, wherein the first guiding surface is configured to displace towards the non-blocking position upon the rise of the ratio of the flow of the first stream of elements with respect to a flow of the stream of elements of the receiving duct, and the second guiding surface is configured to displace towards the non-blocking position upon the rise of the ratio of the flow of second stream of elements with respect to the flow of stream of elements from the receiving duct.

3. The reservoir according to claim 1, wherein the first guiding surface is configured to be in the blocking position when there is no flow of the first stream of elements, and the second guiding surface is configured to be in the blocking position when there is no flow of the second stream of elements.

4. The reservoir according to claim 2, wherein the first guiding surface is configured to be in the blocking position when there is no flow of the first stream of elements, and the second guiding surface is configured to be in the blocking position when there is no flow of the second stream of elements.

5. The reservoir according to claim 1, wherein the first guiding surface in the non-blocking position does not limit the space of the second chamber, and the second guiding surface in the non-blocking position does not limit the space of the first chamber.

6. The reservoir according to claim 2, wherein the first guiding surface in the non-blocking position does not limit the space of the second chamber, and the second guiding surface in the non-blocking position does not limit the space of the first chamber.

7. The reservoir according to claim 3, wherein the first guiding surface in the non-blocking position does not limit the space of the second chamber, and the second guiding surface in the non-blocking position does not limit the space of the first chamber.

8. The reservoir according to claim 1, wherein the first inlet and the second inlet are positioned horizontally.

9. The reservoir according to claim 2, wherein the first inlet and the second inlet are positioned horizontally.

10. The reservoir according to claim 3, wherein the first inlet and the second inlet are positioned horizontally.

11. The reservoir according to claim 5, wherein the first inlet and the second inlet are positioned horizontally.

12. The reservoir according to claim 1, wherein the first inlet and the second inlet are positioned at the same level.

13. The reservoir according to 9, wherein the first inlet and the second inlet are positioned at the same level.

14. The reservoir according to claim 3, wherein the first inlet and the second inlet are positioned at the same level.

15. The reservoir according to claim 5, wherein the first inlet and the second inlet are positioned at the same level.

16. The reservoir according to claim 8, wherein the first inlet and the second inlet are positioned at the same level.

17. The reservoir according to claim 1, further comprising a controller connected to the first filling level sensing means, to the second filling level sensing means, to at least one conveyor of the first feeding duct, and to at least one conveyor of the second feeding duct; and which controller is configured to generate signals for controlling the speed of one or more transporters of the feeding ducts responsive to a signal received from the first filling level sensing means based on a filling level of the first chamber, and a signal received from the second filling level sensing means based on a filling level of the second chamber.

18. The reservoir according to claim 2, further comprising a controller connected to the first filling level sensing means, to the second filling level sensing means, to at least one conveyor of the first feeding duct, and to at least one conveyor of the second feeding duct; and which controller is configured to generate signals for controlling the speed of one or more transporters of the feeding ducts responsive to a signal received from the first filling level sensing means based on a filling level of the first chamber, and a signal received from the second filling level sensing means based on a filling level of the second chamber.

19. The reservoir according to claim 3, further comprising a controller connected to the first filling level sensing means, to the second filling level sensing means, to at least one conveyor of the first feeding duct, and to at least one conveyor) of the second feeding duct; and which controller is configured to generate signals for controlling the speed of one or more transporters of the feeding ducts responsive to a signal received from the first filling level sensing means based on a filling level of the first chamber, and a signal received from the second filling level sensing means based on a filling level of the second chamber.

20. The reservoir according to claim 5, further comprising a controller connected to the first filling level sensing means, to the second filling level sensing means, to at least one conveyor of the first feeding duct, and to at least one conveyor of the second feeding duct; and which controller is configured to generate signals for controlling the speed of one or more transporters of the feeding ducts responsive to a signal received from the first filling level sensing means based on a filling level of the first chamber, and a signal received from the second filling level sensing means based on a filling level of the second chamber.

21. The reservoir according to claim 8, further comprising a controller connected to the first filling level sensing means, to the second filling level sensing means, to at least one conveyor of the first feeding duct), and to at least one conveyor of the second feeding duct; and which controller is configured to generate signals for controlling the speed of one or more transporters of the feeding ducts responsive to a signal received from the first filling level sensing means based on a filling level of the first chamber, and a signal received from the second filling level sensing means based on a filling level of the second chamber.

22. The reservoir according to claim 12, further comprising a controller connected to the first filling level sensing means, to the second filling level sensing means, to at least one conveyor of the first feeding duct, and to at least one conveyor of the second feeding duct; and which controller is configured to generate signals for controlling the speed of one or more transporters of the feeding ducts responsive to a signal received from the first filling level sensing means based on a filling level of the first chamber, and a signal received from the second filling level sensing means based on a filling level of the second chamber.

* * * * *